(12) United States Patent
Walley et al.

(10) Patent No.: US 8,559,881 B2
(45) Date of Patent: Oct. 15, 2013

(54) METHOD AND SYSTEM FOR DYNAMIC SELECTION OF A COEXISTENCE METHOD AND TRANSMIT POWER LEVEL BASED ON CALIBRATION DATA

(75) Inventors: John Walley, Ladera Ranch, CA (US); Prasanna Desai, Elfin Forest, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/493,176

(22) Filed: Jun. 11, 2012

(65) Prior Publication Data

US 2012/0252375 A1  Oct. 4, 2012

Related U.S. Application Data

(63) Continuation of application No. 12/428,085, filed on Apr. 22, 2009, now Pat. No. 8,200,161.

(51) Int. Cl.
*H04B 1/00* (2006.01)
(52) U.S. Cl.
USPC .................. 455/63.1; 455/296; 455/114.2
(58) Field of Classification Search
USPC .................... 455/63.1, 296, 114.2
See application file for complete search history.

(56) References Cited

U.S. PATENT DOCUMENTS

| 6,334,059 | B1 * | 12/2001 | Stilp et al. ............... 455/404.2 |
| 6,765,531 | B2 * | 7/2004 | Anderson ................. 342/378 |
| 7,197,291 | B2 | 3/2007 | Mach et al. |
| 7,474,677 | B2 | 1/2009 | Trott |
| 7,555,301 | B2 | 6/2009 | Skafidas et al. |
| 7,751,377 | B2 | 7/2010 | Yang et al. |
| 7,761,075 | B2 | 7/2010 | Cleveland et al. |
| 7,881,746 | B2 | 2/2011 | Desai |
| 8,121,573 | B2 * | 2/2012 | Haralabidis et al. ......... 455/260 |
| 8,200,161 | B2 | 6/2012 | Walley et al. |
| 8,285,201 | B2 * | 10/2012 | Gore et al. ................. 455/11.1 |

* cited by examiner

*Primary Examiner* — Patricia Nguyen
(74) *Attorney, Agent, or Firm* — Thomas|Horstmeyer, LLP.

(57) ABSTRACT

Aspects of the invention may comprise a control system in communication with a radio frequency (RF) front-end subsystem. The RF front-end subsystem comprises a plurality of antennas coupled to a plurality of wireless transmitters or receivers. Each of the wireless transmitters or receivers is operable to communicate via one or more of a plurality of wireless interfaces in the communication device. The control system is configured to detect, based on interference data provided by the RF front-end system, potential interference by an interfering one of said plurality of wireless transmitters or receivers with operations of an interfered-with one of said plurality of wireless transmitters or receivers. The control system is further configured to mitigate said detected interference operation by providing calibration data to said interfered-with one or more of said plurality of wireless transmitters or receivers.

18 Claims, 5 Drawing Sheets

METHOD AND SYSTEM FOR DYNAMIC SELECTION OF A COEXISTENCE METHOD AND TRANSMIT POWER LEVEL BASED ON CALIBRATION DATA

CROSS-REFERENCE TO RELATED APPLICATIONS/INCORPORATION BY REFERENCE

This application is a continuation of U.S. patent application Ser. No. 12/428,085, filed Apr. 22, 2009, which is incorporated by reference in its entirety herein.

FIELD OF THE INVENTION

Certain embodiments of the invention relate to wireless communication. More specifically, certain embodiments of the invention relate to a method and system for dynamic selection of a coexistence method and transmit power level based on calibration data.

BACKGROUND OF THE INVENTION

The growth of system connectivity has been one of the major developments in recent years. Fewer and fewer systems are operating as stand-alone system, and most of today's systems are increasingly becoming elements of one or more larger or complex networks. This growth in various networking technologies have provided improved performance and increased flexibility for these networks. Various wired and/or wireless based communication standards have been developed to satisfy demands for ever expanding system connectivity. The growth of system connectivity has also spurred a growth in applications that takes advantage of the benefits offered by the improved system connectivity, especially those having access to entities that provides improved processing and/or storage capabilities.

Communication devices, which may be mobile and/or stationary, may comprise a plurality of wired and/or wireless interfaces to enable use of various standards for communicating data. For example, mobile devices, which enable cellular connectivity, have become a near absolute necessity in today's world. While mobile technology originally evolved from traditional land-based communication technologies, and was merely intended to add an element of mobility to the traditional telephony service, this technology has grown beyond that initial purpose. Many modern mobile technologies, including such technologies as GSM/GPRS/EDGE, UMTS, CDMA2000, and LTE, incorporate substantial data capabilities. Most of today's mobile services comprise such features as text messaging, audio/video streaming, and web browsing.

Modern communication devices may also be operable to utilize other wireless interfaces to communicate via, for example, wireless personal area networks (WPAN) and/or wireless local area network (WLAN) interfaces. The use of wireless personal area networks (WPAN) continues to gain popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). An exemplary WPAN system utilizes a standardized technology such as Class 2 Bluetooth (BT) technology. While WPAN may be very beneficial for certain applications, other applications may require larger service areas and/or capabilities. To satisfy such needs, other technologies such as Wireless local area networks (WLAN) have been developed to provide greater wireless service. In contrast to the WPAN systems, WLAN provide connectivity to devices that are located within a slightly larger geographical area, such as the area covered by a building or a campus, for example.

WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system. Some WLAN systems are operated in conjunction with WPAN systems to provide users with an enhanced overall functionality. For example, Bluetooth technology may be utilized to connect a laptop computer or a handheld wireless terminal to a peripheral device, such as a keyboard, mouse, headphone and/or printer, while the laptop computer or the handheld wireless terminal is also connected to a campus-wide WLAN network through an access point (AP) located within the building. Also, mobile technology enables the use of the mobile phone as a form of wireless modem that allows connecting a laptop, for example, to the internet via a mobile network. More recently, Worldwide Interoperability for Microwave Access (WiMAX) based systems have become popular, and use of WiMAX to provide wireless connectivity is expanding.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for dynamic selection of a coexistence method and transmit power level based on calibration data, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for dynamic selection of a coexistence method and transmit power level based on calibration data. In various embodiments of the invention, operations of wireless transmitters and/or receivers in a communication device may be calibrated to mitigate potential interference caused during concurrent communications via the wireless interfaces in the communication device. Calibration may be performed dynamically, and may comprise managing system parameters and/or physical resources of the communication device and/or the wireless transmitters and/or receivers; managing characteristics of wireless communication performed via the wireless transmitters and/or receivers; and/or managing isolation between two or more of the plurality of wireless transmitters and/or receivers in the communication device. System parameters and/or physical resources may comprise adaptive frequency bands, time slots, antenna access, frequency hopping (AFH) maps, transmission power, and use of linearity and/or blocking, and/or antenna settings. Isolation may comprise spatial isolation and/or time-domain based isolation, utilizing transmission and/or reception scheduling arbitration, for example. Characteristics of wireless communication may comprise packet types, packet priority, and/or start time and/or end time of communicated frames. Management of the characteristics of wireless communication may be performed based on performance parameters, which may comprise data transmission priority and/or quality of service (QoS) parameters.

The calibration may be performed based on data generated, via the wireless transmitters and/or receivers, during active and/or idle phases of operations. The data may be based on monitoring, via each of the wireless transmitters and/or receivers, of operations of remaining wireless transmitters and/or receivers. The monitoring may be performed during active and/or or idle states in the monitoring wireless transmitters and/or receivers. The monitoring may comprise tracking received signal strength indicator (RSSI) data during wireless transmission via monitored wireless transmitters and/or receivers. A coexistence manager may be utilized in the communication device to manage overall calibration operations, and may exchange data and/or control signaling with each of the wireless transmitters and/or receivers to enable performing calibration operations. A maximum transmission power level for each of monitored wireless transmitters may be determined, based on monitored data, to enable performing wireless reception via monitoring wireless receivers during wireless transmission via the monitored wireless transmitters.

Figure 1:
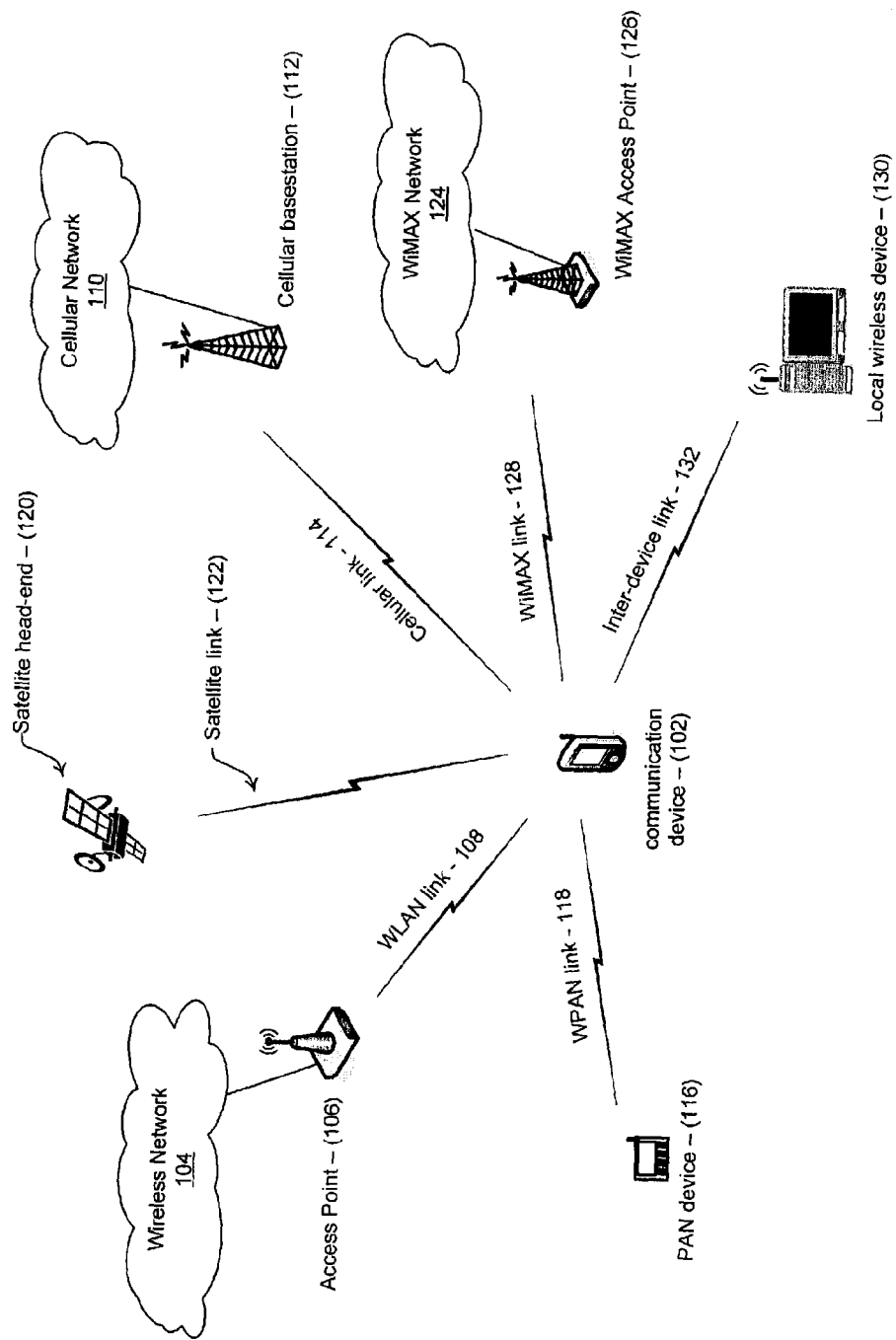
FIG. 1 is a block diagram that illustrates an exemplary communication system comprising a communication device that is operable to support a plurality of wireless interfaces, in accordance with an embodiment of the invention.

FIG. 1 is a block diagram that illustrates an exemplary communication system comprising a communication device that is operable to support a plurality of wireless interfaces, in accordance with an embodiment of the invention. Referring to FIG. 1, there is shown a communication device 102, a wireless network 104, an access point 106, a wireless local network area (WLAN) link 108, a cellular network 110, a cellular base station 112, and a cellular link 114. FIG. 1 also comprises a personal area network (PAN) device 116, a wireless personal area network (WPAN) link 118, a satellite head-end 120, a satellite link 122, a Worldwide Interoperability for Microwave Access (WiMAX) network 124, a WiMAX access point 126, a WiMAX link 128, a local wireless device 130, and an inter-device link 132.

The communication device 102 may comprise suitable logic, circuitry, interfaces and/or code that may enable communications via a plurality of wireless interfaces, utilizing one or more radio transceivers. The communication device 102 may comprise, for example, a personal user-end device that may be operable to execute various tasks and/or applications requested via device users, wherein at least some of operations performed via the communication device 102 may require interactions with one or more other devices and/or networks via one or more wireless interfaces. The communication device 102 may be operable, for example, to support and/or utilize the WLAN link 108, the WPAN link 118, the satellite link 122, the WiMAX link 128 and/or the inter-device link 132. Exemplary devices comprise a PDA, a Smartphone, a laptop and/or a PC that are operable to utilize one or more wireless communication interfaces.

The wireless network 104 may comprise a plurality of wireless local area network (WLAN) access points, and suitable logic, circuitry and/or code that may enable implementing a functional block corresponding to a wireless LAN technology. Exemplary wireless LAN technology may comprise for example IEEE 802.11 based networks.

The cellular network 110 may comprise a plurality of the cellular base station 112, and suitable logic, circuitry and/or code that may enable communication via one or more cellular technologies. Exemplary cellular technologies may comprise CDMA, WCDMA, CDMA1000, HSDPA, GSM, GPRS, EDGE, and UMTS. The cellular base station 112 may comprise suitable hardware, logic, circuitry, and/or code that may enable transmission and/or reception of cellular based communications between the cellular network 110 and cellular capable devices, for example the communication device 102. The cellular base station 112 may correspond, for example, to base stations and/or cellular towers and/or within a cellular communication system.

The PAN device 116 may comprise suitable logic, circuitry, interfaces and/or code that may enable performing some accessory functionality in conjunction with use of other devices, for example the communication device 102, based on one or more PAN protocols. For example, the PAN device 116 may comprise a hands-free headset that may be utilized, in conjunction with the communication device 102, during cellular based voice calls. The communication device 102 may interact with the PAN device 116 via one or more PAN interfaces, which may be based on wired and/or wireless PAN interfaces. For example, the communication device 102 may communicate with the PAN device 116 via the WPAN link 118. The WPAN link 118 may correspond to Bluetooth, Zig-Bee, and/or Ultra-Wideband (UWB) connections between the PAN device 116 and the communication device 102.

The satellite head-end 120 may comprise suitable logic, circuitry and/or code that may enable communication with land-based devices via satellite links, including, for example, the satellite link 122. The satellite head-end 120 may comprise, for example, an orbiting satellite node in a global navigation satellite system (GNSS), which may comprise, for example, the Global Positioning System (GPS), GLONASS and/or Galileo satellite systems based interfaces. The satellite link 122 may enable unidirectional and/or bidirectional communication between the satellite head-end 120 and land-based devices, for example the communication device 102.

The WiMAX network 124 may comprise a plurality of the WiMAX access points 126, and may comprise suitable interfaces, logic, circuitry and/or code that may enable Worldwide Interoperability for Microwave Access (WiMAX) compliant communication. The WiMAX access point 126 may comprise suitable hardware, logic, circuitry, and/or code that may enable transmission and/or reception of WiMAX based communications between the WiMAX network 124 and WiMAX capable devices, for example the communication device 102.

The local wireless device 130 may comprise suitable logic, circuitry, interfaces and/or code that may be enabled to communicate with the communication device 102 to perform one or more tasks requested by the communication device 102. The invention may not be limited to a specific device, and may comprise, for example, a general purpose processing device, a specialized processing device, a specialized peripheral device, or any combination of suitable hardware, and/or code, which may be enabled to perform a task requested via the communication device 102. The local wireless device 130 may comprise, for example, a high-definition television (HDTV) set, a dedicated audio system, and/or a digital video player device, which may be optimized to provide improved audio and/or video output quality. The local wireless device 130 may be enabled to communicate with the communication device 102 directly via one or more wireless interfaces utilizing one or more wireless connections. Exemplary wireless connections may be operable to handle, for example, WLAN, WiMAX, and/or WPAN traffic. Alternatively, the communication between the local wireless device 130 and the communication device 102 may be performed directly based on the inter-device interface 132, which may be operable to establish and maintain connections between specific devices. For example, the inter-device interface 132 may comprise a proprietary wireless interface that enables wireless communication between a class of devices that may comprise the local wireless device 130 and the communication device 102.

In operation, the communication device 102 may be utilized to perform one or more tasks requested via users of the communication device 102, wherein the communication device 102 may need to communicate with one or more other entities to perform various requested tasks. For example, the communication device 102 may enable personal communication, use of satellite based location determination, interactive gaming, and/or playing of audio/video streams received from external sources. The communication device 102 may enable connectivity via a plurality of available networks and/or wireless interfaces, which may be necessary to perform requested tasks. For example, the communication device 102 may utilize the WLAN link 108 to access the wireless network 104 via the access point 106. The communication device 102 may also utilize the cellular link 114 to access the cellular network 110 via the cellular transceiver 112 and/or utilize the WiMAX link 128 to access the WiMAX network 124 via the WiMAX access point 126. The communication device 102 may also communicate directly with devices and/or resources that may be communicatively coupled with the communication device 102. For example, the communication device 102 may communicate directly with the local networked device 130, via the inter-device link 132; and/or may communicate directly with the PAN device 116 via the WPAN link 118.

During wireless communication by the communication device 102, RF signals may be transmitted and/or received to facilitate data communication and/or signaling utilizing on one or more of the supported wireless interfaces in the communication device 102, and utilizing a plurality of RF subsystems that enable use of one or more antenna to facilitate the RF communications. For example, during communication between the communication device 102 and the PAN device 116, Bluetooth RF signals comprising voice, video and/or data packets may be communicated between the communication device 102 and the PAN device 116. Similarly, the communication device 102 may be operable to perform WLAN, WiMAX, cellular and/or other types of RF communication via the WLAN link 108, the WiMAX link 128, the cellular link 112, and/or other wireless links, respectively, which are supported via the communication devices 102.

Each type of RF communication may similarly be subject to a specific RF protocol requirement. For example, WLAN RF communication based on the 802.11 protocol requirements may be performed only at specific frequency bands, for example the 2.4 GHz and/or 5 GHz bands. Bluetooth RF communication may also occur in the 2.4 GHz band. WiMax RF communication based on the 802.16 protocol requirements may be performed only at specific frequency bands, for example the 2-11 GHz band. Because some of the frequency bands utilized with various wireless interfaces may overlap, simultaneous communication based on the wireless communication protocols that are utilized may be limited by interference caused by use of the same and/or adjacent frequencies. For example, Bluetooth RF transmission at about 2.4 GHz via the communication device 102 may cause interference with 802.11 based RF reception in the communication device 102 where the 802.11 RF signals are transmitted by a source device within the 2.4 GHz band.

In an exemplary aspect of the invention, various techniques may be utilized via the communication device 102 to enable and/or to improve coexistence of concurrent RF communication via one or more wireless interfaces supported via the communication device 102. Coexistence solutions may enable multiple RF subsystems to operate in the same device. The coexistence may be based on existence and/or use of sufficient isolation between the RF subsystems that no or little interference may be caused by an RF subsystem to other RF subsystems such that concurrent RF transmission and/or reception operations may be performed without any additional processing and/or management. Coexistence may also be based on time domain based techniques, using, for example, arbitration based scheduling, which may ensure that RF transmissions that potentially may cause interference may be completely blocked during allocated periods for RF reception via other RF subsystems.

In various embodiments of the invention, coexistence performance in communication devices comprising multiple radios, for example the communication device 102, may be improved by utilizing calibration masking on various RF coupling paths. Calibration may comprise managing, adjusting and/or controlling operations and/or parameters that are relevant to RF communications via the communication device 102. Calibration masking may be utilized, for example, to enable masking at least some effects of RF transmission and/or reception via a wireless link in the communication device 102 such that potential interference to other RF transmissions and/or receptions may be prevented and/or reduced. Consequently, calibration masking may optimize, for example, use of various coexistence related parameters and/or data, which may comprise, for example, adaptive frequency settings, output transmission power, antenna settings, linearity/phase noise, and/or parameters and/or characteristics of underlying wireless communications. The calibration may be preprocessed, during design of the communication device 102 for example, and/or may be performed dynamically during RF operations in the communication device 102.

Figure 2A:
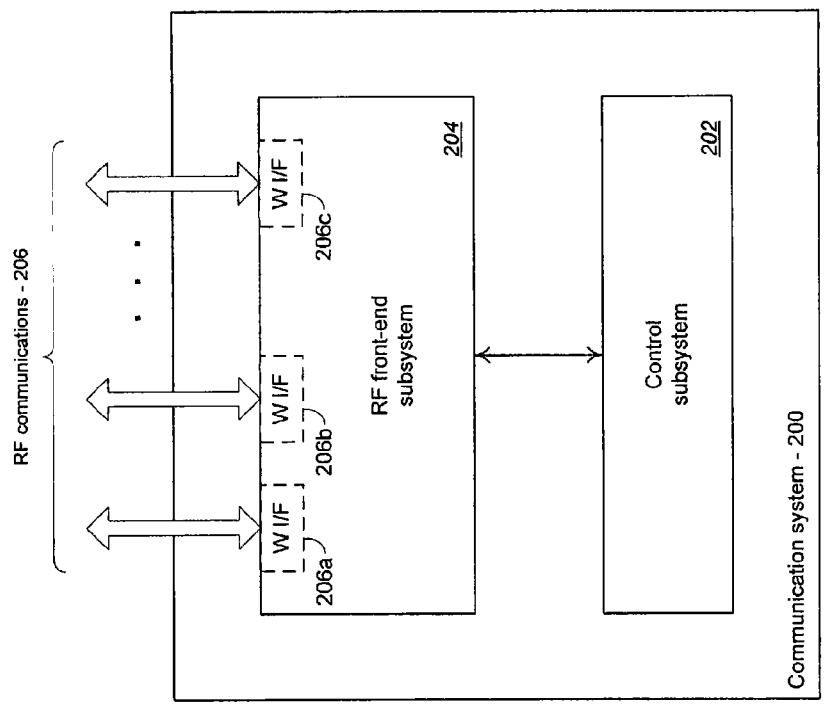
FIG. 2A is a block diagram that illustrates an exemplary communication system that is operable to support multiple wireless interfaces utilizing coexistence techniques, in accordance with an embodiment of the invention.

FIG. 2A is a block diagram that illustrates an exemplary communication system that is operable to support multiple wireless interfaces utilizing coexistence techniques, in accordance with an embodiment of the invention. Referring to FIG.

2A, there is shown a communication system 200 comprising a control subsystem 202 and an RF front-end subsystem 204.

The communication system 200 may comprise the control subsystem 202, the RF front-end subsystem 204, and suitable logic, circuitry, interfaces and/or code that may enable providing RF based communication operations to facilitate communication via a plurality of wireless interfaces 206a, ..., 206c in a communication device. The wireless interfaces 206a, ..., 206c may comprise, for example, a Wireless LAN (WLAN) interface, an Ultra-wideband (UWB) interface, a WiMAX interface, a cellular interface, a Bluetooth interface, a ZigBee interface, a GNSS interface, and/or an FM interface.

The control subsystem 202 may comprise suitable logic, circuitry, interfaces and/or code that may be operable to provide management and/or control functionality in the communication system 200 to support RF transmission and/or reception operations during communication via the plurality wireless interfaces 206a, ..., 206c.

The RF front-end subsystem 204 may comprise suitable logic, circuitry and/or code that may be operable to perform RF transmission and/or reception, utilizing a plurality of antennas and/or frequency bands, during communications via the plurality of wireless interfaces 206a, ..., 206c.

In operation, the communication system 200 may be integrated in a communication device, for example the communication device 102, to facilitate RF communication. The communication system 200 may be operable, for example, to provide RF communication corresponding to Bluetooth, WLAN, WiMAX, cellular and/or FM based communications in the communication device 102. The communications may occur separately or concurrently. The RF front-end subsystem 204 may be operable to perform RF transmission and/or reception signals comprising data and/or control packets for the various wireless communication protocols. The control subsystem 202 may be operable to control and/or manage the operations of the RF front-end subsystem 204, based on, for example, feedback provided via the subsystem 204, predefined and/or dynamically determined information, and/or based on input provided to the communication system 200, by the communication device 102 and/or its users. For example, the control subsystem 202 may be operable to configure the RF front-end subsystem 204; to manage use of frequency bands that be available to RF communication based on supported wireless interfaces; to manage, control and/or support RF processing operations; and/or to request and/or process interference related operation related data receive from the RF front-end subsystem 204. The RF front-end subsystem 204 may be operable, for example, to monitor effects of RF transmissions on remaining RF operations available via the RF front-end subsystem 204.

In an exemplary aspect of the invention, the communication system 200 may be operable to enable calibrating coexistence operations available via the communication system 200. For example, the control subsystem 202 and/or the RF front-end subsystem 204 may be operable to utilize calibration techniques that enable improving isolation performance via the RF front-end subsystem 204 and/or time-domain based arbitration scheduling in the communication system 200 to facilitate concurrent RF communications that may utilize the same and/or adjacent frequency bands. For example, calibration techniques may comprise managing, adjusting and/or controlling operations and/or parameters that are relevant to RF communications via the communication system 200. Calibration may be utilized, for example, to mask at least some effects of RF transmission and/or reception, performed during communication through one of the plurality of wireless interfaces 206a, ..., 206c, to other wireless interfaces and/or communication links in the communication system 200 such that potential RF interference may be prevented and/or reduced. The calibration related data may be generated and/or utilized to optimize, for example, RF coupling paths via the communication system 200 to optimize various coexistence parameters, which may comprise, for example, adaptive frequency settings, output transmission power, antenna settings, linearity/phase noise, and/or parameters and/or characteristics of underlying wireless communications. For example, FM based RF transmission, via the RF front-end subsystem 204, may produce harmonics that may fall into the GPS RF band adversely affecting GPS based RF reception in communication system 200. Concurrent FM and GPS RF communication via the RF front-end subsystem 204, however, may be achieved by lowering the transmit power levels utilized during FM based RF transmission and/or by adjusting the linearity parameters utilizing during processing of received GPS based RF signals to suppress, for example, some of the interference caused by the FM RF transmission. The calibration processing via the communication system may be performed dynamically during RF operations, during initialization, and/or during a calibration operating mode of the communication system 200. Additionally, the RF front-end subsystem 204 monitoring function may be utilized to enable maintaining and/or updating a local RF interference related database, via the controlling subsystem 202 for example, which may subsequently be utilized to plan and/or configure coexistence operations during concurrent RF communications via the communication system 200.

Figure 2B:
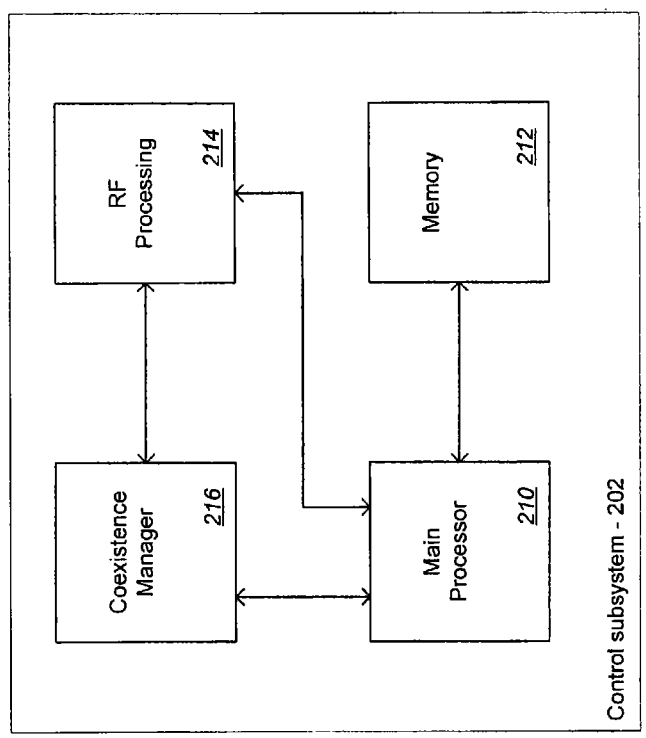
FIG. 2B is a block diagram that illustrates an exemplary control subsystem that enables managing and/or controlling RF communication in a system that supports RF coexistence, in accordance with an embodiment of the invention.

FIG. 2B is a block diagram that illustrates an exemplary control subsystem that enables managing and/or controlling RF communication in a system that supports RF coexistence, in accordance with an embodiment of the invention. Referring to FIG. 2B, there is shown the control subsystem 202 comprising a main processor 210, a memory 212, a RF processing block 214, and a coexistence manager function 216.

The control subsystem 202 may comprise the main processor 210, the memory 212, the RF processing block 214, the coexistence manager function 216, and/or suitable logic, circuitry, interfaces and/or code that may enable facilitating, managing and/or controlling communication operations via a plurality of RF transceivers based on a plurality of wireless interfaces, substantially as described with regards to FIG. 2A. The control subsystem 202 may be operable to enable providing management and/or control functionality in a communication system, for example the communication system 200, which may support RF transmission and/or reception during communication via a plurality wireless interfaces.

The main processor 210 may comprise suitable logic, circuitry and/or code that may enable controlling, managing and/or supporting processing operations in the control subsystem 202 and/or the communication system 200. The main processor 210 may be utilized to control at least a portion of the memory 212, the RF processing block 214, the coexistence manager function 216, and/or the RF front-end subsystem 204. In this regard, the main processor 210 may generate, for example, signals for controlling operations within the control subsystem 202 and/or the RF front-end subsystem 204. The main processor 210 may also enable execution of applications that may be utilized by the control subsystem 202.

The memory 212 may comprise suitable logic, circuitry and/or code that may enable storage of data, code and/or other information utilized, for example, by the control subsystem 202 and/or the RF front-end subsystem 204. For example, the memory 212 may be utilized for storing configuration data and/or execution code that is utilized by the main processor

210. The memory 212 may also be utilized to store information, such as configuration and/or management information that may be utilized to control the operations of at least a portion of the RF front-end subsystem 204.

The RF processing block 214 may comprise suitable logic, circuitry, and/or code that may be enabled to provide dedicated processing operations during RF transmission and/or reception operations in the communication system 200. The RF processing block 214 may enable, for example, processing of baseband signals during transmission and/or reception of RF signals via the RF front-end subsystem 204. The RF processing block 214 may also be operable to enable generating control and/or processing signals, such as local oscillator signals, to facilitate performing conversion and/or modulation operations during reception and/or transmission of RF signals. Although the RF processing block 214 may be depicted as a single block, the invention need not be so limited. Accordingly, other embodiments of the invention may comprise a plurality of baseband processors for processing signals for one or more available RF transceivers.

The coexistence manager function 216 may comprise suitable logic, circuitry, interfaces and/or code that may enable managing coexistence operations via the communication system 200. The coexistence manager function 216 may be operable to process feedback information and/or signals provided by the RF front-end subsystem 204, for example, to enable planning coexistence operations. The coexistence operations may comprise real-time, dynamic calibration of the RF operations in the RF front-end subsystem during concurrent RF communications.

In operation, the control subsystem 202 may be operable to control and/or manage the operations of the RF front-end subsystem 204. The main processor 210 and/or the RF processing block 214 may enable configuring of the RF front-end subsystem 204, based on configuration information stored via the memory 212 for example, managing and/or controlling use of frequency bands that be available to RF communication based on supported wireless interfaces, and/or controlling and/or contributing to RF processing operations that facilitate transmission and/or reception of RF signals via the RF front-end subsystem 204. The main processor 210 may also enable processing feedback provided via the RF front-end subsystem 204, predefined parameters stored via the memory 212, dynamically determined information during processing operations, and/or input provided into the communication system 200. For example, the main processor 210 may process interference related data received from the RF front-end subsystem 204, which may be requested via the coexistence manager function 216. The interference data may then be stored via the memory 212, wherein the interference data may subsequently be retrieved to enable performing, for example, coexistence operations during RF communication.

During coexistence operations, the main processor 210, the memory 212, the RF processing block 214 and/or the coexistence manager function 216 may be operable to control, manage and/or support calibrating coexistence operations available via the communication system 200. For example, the coexistence manager function 216 may be operable to determine potential RF interference that may arise during simultaneous RF communications via the RF front-end subsystem 204, which may be performed via the same and/or adjacent frequency bands, based on real-time feedback and/or predetermine interference data available via the memory 212. The coexistence manager function 216 may then be operable to determine applicable coexistence techniques and/or calibration data that may enable improving isolation performance via the RF front-end subsystem 204 and/or time-domain based arbitration scheduling to facilitate concurrent RF communications via the RF front-end subsystem 204. Various coexistence techniques and/or calibration data may be provided by the coexistence manager function 216. For example, adaptive frequency hopping (AFH) maps, which may be maintained via the memory 212, may be adjusted to enable avoiding certain frequencies; antenna settings, which may comprise directionality parameters that enable directional transmit and/or receive behavior, may be adjusted; and/or RF processing parameters including transmit power level, receive linearity and/or filtering, and/or adaptive noise cancellation algorithms may also be used and/or modified. Use of AHF maps may enable, for example, avoiding one or more Bluetooth channels during Bluetooth communication to mitigate potential interference that may be caused by and/or to Bluetooth transmission and/or reception via the RF front-end subsystem 204. Some coexistence techniques may also be utilized during RF processing operations. For example, high-low injection may be utilized, via, for example via the RF processing block 214, to prevent and/or remedy potential interference during RF processing of signals communicated via the RF front-end subsystem 204. With high-side injection, the local oscillator (LO) frequency used during modulation and/or demodulation processing operations is higher than the target RF carrier signal frequency, while in low-side injection, the LO frequency used is lower than the target RF carrier signal frequency; in either case, the same intermediate frequency (IF) is generated. Accordingly, the LO frequency used may be managed, controlled, and/or adjusted to enable avoiding use the type of injection that may be suspect to interference, cause by, for example, harmonics of other RF signals. For example, the LO frequency used during processing of GPS signals via the system 200 may be adjusted and/or modified to enable use of high-side injection and/or low-side injection to remedy potential interference that may be introduced by harmonics of FM signals.

In an embodiment of the invention, the parameters and/or characteristics of data transfer based on the underlying wireless interface may also me modified and/or configured. Quality of service (QoS) and/or priority of data transfer may be utilized and/or adjusted to prevent, mitigate and/or overcome potential interference. Accordingly, during management of concurrent communications with potential RF interference, preference may be given, during calibration operations, to communications with higher QoS or priority of data transfer. Delivery parameters, as determined and/or utilized via MAC layers in the supported wireless interfaces for example, may be adjusted to enable mitigating packet loss caused by RF interference by use of packet retransmission techniques. For example, during management of concurrent communications with potential RF interference, retransmission mechanisms may be configured and utilized to ensure delivery of data that may be lost because of RF interference.

Figure 2C:
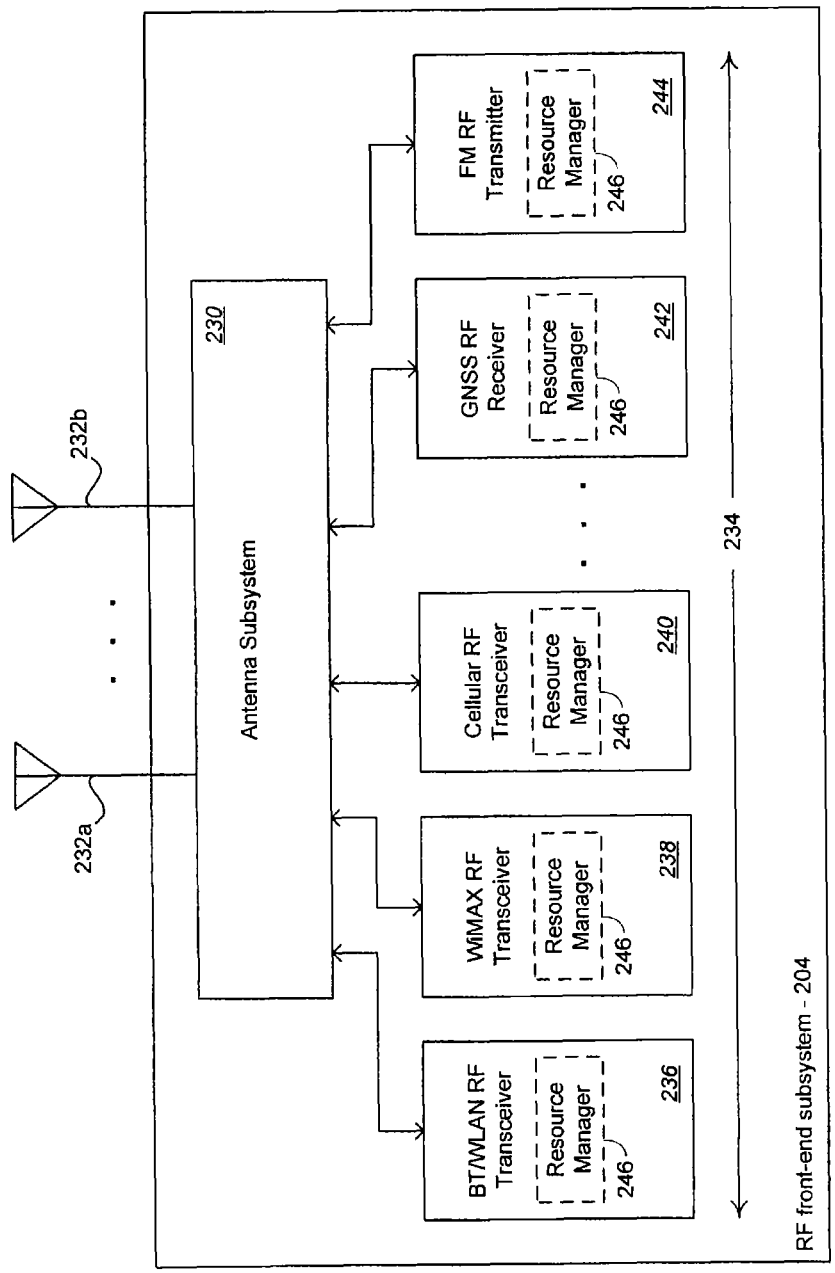
FIG. 2C is a block diagram that illustrates an exemplary RF front-end subsystem that enables performing RF communication in a system that supports RF coexistence, in accordance with an embodiment of the invention.

FIG. 2C is a block diagram that illustrates an exemplary RF front-end subsystem that enables performing RF communication in a system that supports RF coexistence, in accordance with an embodiment of the invention. Referring to FIG. 2C, there is shown the RF front-end subsystem 204 comprising an antenna subsystem 230, and a plurality of antennas 232*a*, . . . , 232*b*, and a plurality of RF transceivers 234 which may comprise a BT/WLAN RF transceiver 236, a WiMAX RF transceiver 238*a*, cellular RF transceiver 240, a GNSS RF receiver 242, and an FM RF transmitter 244. Each of the RF transceivers in the plurality of RF transceivers 234 may also comprise a resource manager 246.

The RF front-end subsystem 204 may comprise, for example, the antenna subsystem 230, and a plurality of antennas 232a, ..., 232b, and a plurality of RF transceivers 234, and/or suitable logic, circuitry, interfaces and/or code that may enable performing RF transmission and/or reception operations subject to control and/or management provided via the control subsystem 202, substantially as described with regards to FIGS. 2A and 2B. The RF front-end subsystem 204 may be operable to enable performing RF transmission and/or reception during communications via a plurality of wireless interfaces. The RF front-end subsystem 204 may be integrated within a communication system, for example the communication system 200, to enable supporting concurrent RF transmission and/or reception during communication via a plurality wireless interfaces utilizing calibration based coexistence techniques, in accordance with an embodiment of the invention.

The BT/WLAN RF transceiver 236 may comprise suitable logic, circuitry and/or code that may enable performing Bluetooth (BT) and/or wireless LAN (WLAN) communications. The BT/WLAN RF transceiver 236 may be operable, for example, to enable processing of transmitted and/or received WLAN and/or BT based RF signals via the antenna subsystem 230 and one or more of the plurality of antennas 232a, ..., 232b. The BT/WLAN RF transceiver 236 may be operable, for example, to perform amplification, filtering modulation and/or conversion processing operations to facilitate transmitting and/or receiving of RF signals at appropriate and/or configured frequencies.

The WiMAX RF transceiver 238 may comprise suitable logic, circuitry and/or code that may enable performing WiMAX communications. The WiMAX RF transceiver 238 may be operable, for example, to enable processing of transmitted and/or received WiMAX based RF signals via the antenna subsystem 230 and one or more of the plurality of antennas 232a, ..., 232b. The WiMAX RF transceiver 238 may be operable, for example, to perform amplification, filtering modulation and/or conversion processing operations to facilitate transmitting and/or receiving of RF signals at appropriate and/or configured frequencies.

The cellular RF transceiver 240 may comprise suitable logic, circuitry and/or code that may enable performing cellular communications. Exemplary cellular interfaces comprise GSM, UMTS, CDMA2000 and/or WCDMA. The cellular RF transceiver 240 may be operable, for example, to enable processing of transmitted and/or received cellular based RF signals via the antenna subsystem 230 and one or more of the plurality of antennas 232a, ..., 232b. The cellular RF transceiver 240 may be operable, for example, to perform amplification, filtering modulation and/or conversion processing operations to facilitate transmitting and/or receiving of RF signals at appropriate and/or configured frequencies.

The GNSS RF receiver 242 may comprise suitable logic, circuitry and/or code that may enable performing GNSS communications. Exemplary GNSS interfaces may comprise, for example, GPS, GLONASS and/or Galileo satellite systems based interfaces. The GNSS RF receiver 242 may be operable, for example, to enable processing received GNSS based signals via the antenna subsystem 230 and one or more of the plurality of antennas 232a, ..., 232b. The GNSS RF receiver 242 may be operable, for example, to perform amplification, filtering modulation and/or conversion processing operations to facilitate reception of RF signals at appropriate and/or configured frequencies.

The FM RF transmitter 244 may comprise suitable logic, circuitry and/or code that may enable performing frequency modulation (FM) communications. The FM RF transmitter 244 may be operable, for example, to enable processing transmitted FM based signals via the antenna subsystem 230 and one or more of the plurality of antennas 232a, ..., 232b. The FM RF transmitter 238 may be operable, for example, to perform amplification, filtering modulation and/or conversion processing operations to facilitate transmission of RF signals at appropriate and/or configured frequencies.

The antenna subsystem 230 may comprise suitable logic, circuitry and/or code that may enable switching and/or routing of RF signals generated and/or processed via the BT/WLAN RF transceiver 236, the WiMAX RF transceiver 238, the cellular RF transceiver 240, the GNSS RF receiver 242 and/or the FM transmitter 244, which are transmitted and/or received via one or more of the plurality of antennas 232a, ..., 232b. Each of the plurality of antennas 232a, ..., 232b may comprise suitable logic, circuitry and/or code that enable transmission and/or reception of RF signals within certain bandwidths. For example, one or more of the plurality of antennas 232a, ..., 232b may enable RF transmission and/or reception via the 2.4 GHz, which is suitable for WiMAX, Bluetooth and/or WLAN RF transmissions and/or receptions. The plurality of antennas 232a, ..., 232b may be communicatively coupled to the antenna subsystem 230.

The resource manager 246 may comprise suitable logic, circuitry and/or code that may enable managing of physical and system parameters and/or resources within an RF transceiver. The resource manager 246 may be integrated into an RF transceiver, for example the BT/WLAN RF transceiver 236, to provide feedback information pertaining to RF operations performed via the RF transceiver and/or information pertaining to effects of RF operations performing via other RF transceivers on the RF transceiver.

In operation, the RF front-end subsystem 204 may be operable to perform, via the plurality of RF transceivers 234, the antenna subsystem 230, and/or the plurality of antennas 232a, ..., 232b RF transmission and/or reception that is necessary facilitate communications pertaining to supported wireless interfaces. For example, during Bluetooth RF communication, the BT/WLAN RF transceiver 236 is operable to receive and/or transmit Bluetooth specific RF signals that are utilized to communicate Bluetooth based data. RF signaling may be routed via the antenna subsystem 230 to facilitate over-the-air transmission and/or reception of the RF signals via one or more of the plurality of antennas 232a, ..., 232b. In an exemplary aspect of the invention, at least some of the plurality of antennas 232a, ..., 232b may be utilized to communication RF signals pertaining to different wireless interfaces but are in the same or sufficient adjacent frequency bands. For example, Bluetooth, 802.11 and/or WiMAX interfaces may be operable to utilize frequency in the 2.4 GHz band. Consequently, RF transmission via one or the plurality of antennas 232a, ..., 232b, pertaining to a wireless interface may adversely affect RF reception via on another antenna in the plurality of antennas 232a, ..., 232b, pertaining to the same and/or another wireless interface.

During coexistence operations, the plurality of RF transceivers 234, the antenna subsystem 230, and/or the plurality of antennas 232a, ..., 232b may be operable to enable utilizing coexistence operations and/or calibration data to facilitate concurrent RF communications. For example, the BT/WLAN RF transceiver 236 and the WiMAX RF transceiver 238 may be operable utilize input provided via the coexistence manager function 216 to adjust and/or modify RF communication operations to reduce, mitigate, and/or eliminate interference during concurrent Bluetooth and WiMAX and RF communication. In an exemplary aspect of the invention, the resource manager 246 may be operable to utilize the calibration data to reconfigure and/or modify RF communication operations in each of the plurality of RF transceivers 234. Additionally, the resource manager 246 may be operable to provide feedback to the coexistence manager function 216 to facilitate coexistence operations. For example, the resource manager 246 in the cellular RF transceiver 240 may be operable to determine isolation of RF communication via the cellular RF transceiver 240 from other RF communications via the plurality of RF transceivers 234 by monitoring received signal strength indicator (RSSI) measurements in each of RF transceivers to determine RSSI effects of RF transmission via remaining RF transceivers by tracking changes in RSSI effects during active and/or idle periods in the monitoring and/or monitored RF transceivers. The resource manager 246 may also be operable to enable updating and/or maintaining data of RF communication parameters, for example frequencies and/or amplitudes, which may have been deemed to degrade BER/PER performance of RF communication via the cellular RF transceiver 240.

Figure 3:
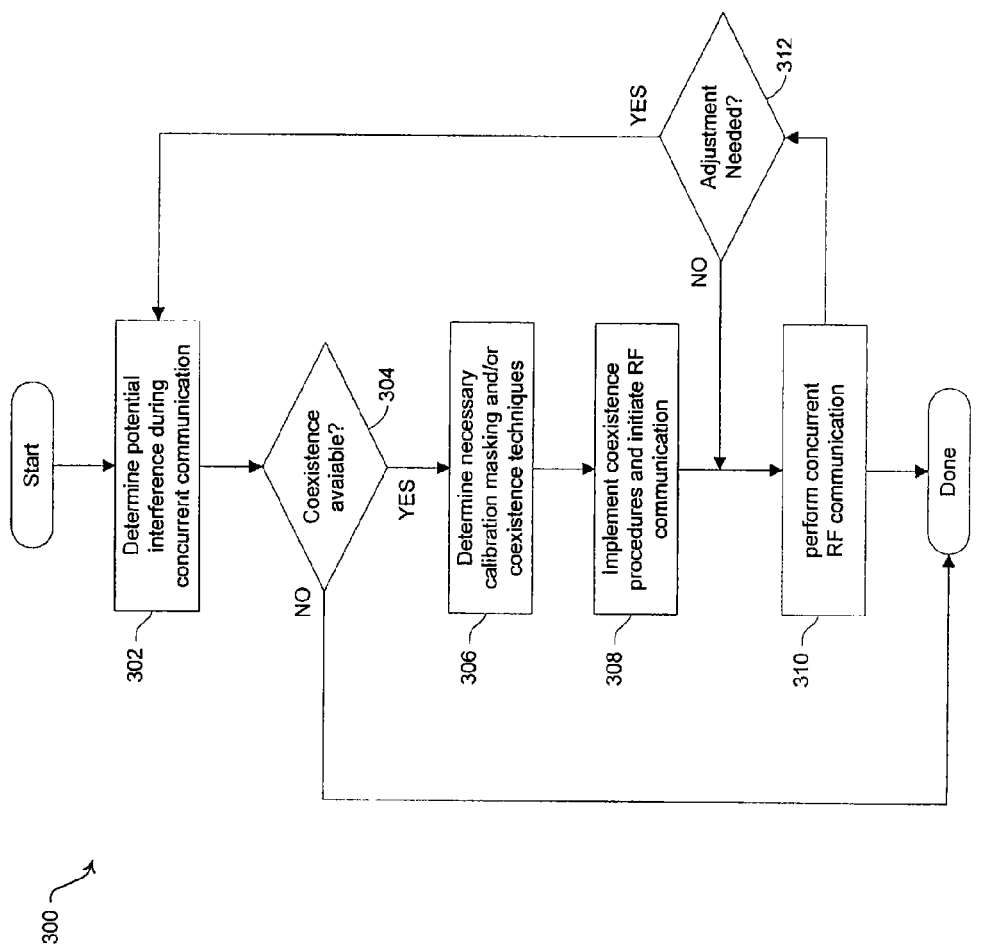
FIG. 3 is a flow chart that illustrates use of dynamic coexistence management in a communication system, in accordance with an embodiment of the invention.

FIG. 3 is a flow chart that illustrates use of dynamic coexistence management in a communication system, in accordance with an embodiment of the invention. Referring to FIG. 3, there is shown a flow chart 300 comprising a plurality of exemplary steps, which may be operable to perform dynamic RF coexistence management in a system that comprises a plurality of RF transceivers.

In step 302, potential interference caused during concurrent RF communication may be determined. For example, the control subsystem 202 may be operable to determine, via the coexistence manager function 216 for example, possible interference that may be caused during RF transmission and/or reception via one of the plurality of radio transceivers 234 to remaining radio transceivers. Potential interference may be caused when communication via one wireless interface may interfere with communication via one or more other wireless interference. In step 304 a determination whether coexistence may be available is performed. The availability of coexistence may be determined, in the communication system 200 based on, for example, a plurality of exemplary factors, comprising system parameters, configuration information, QoS and/or priority parameters of the data transfers, and/or availability of physical resources to support concurrent RF communications. In instances where it may be determined that coexistence is unavailable, the exemplary steps may terminate.

Returning to step 304, in instances where coexistence is available, the exemplary steps proceed to step 306. In step 306, coexistence techniques and/or calibration masking data may be determined. For example, the coexistence manager function 216 may be operable to determine applicable coexistence techniques and/or calibration information that may enable concurrent RF communication via the RF front-end subsystem 204, substantially as described in FIG. 2B. In step 308, the coexistence techniques and/or calibration information are utilized to configure, control, adjust and/or manage RF communications. The RF communications may be configured and/or adjusted directly, by modifying physical (PHY) layer, RF related parameters including, for example, transmission power, user frequency bands and/or modulation parameters. Alternatively, the RF communications may be adjusted and/or configured indirectly via, for example, modifications and/or adjustments in coexistence techniques and/or characteristics of wireless interfaces to which the RF communications correspond. For example, the RF front-end subsystem 204 may be operable to utilize the coexistence and/or calibration data provided via the coexistence manager 216 to configure the corresponding RF coupling paths via the plurality of RF transceivers 234, the antenna subsystem 230, and/or the plurality of antennas 232a, . . . , 232b to facilitate concurrent RF communications. Wireless interface modification may comprise, for example, adjusting and/or controlling media access control (MAC) based parameters, including retransmission and/or packet encapsulation parameters. In the step 310, the RF communications are performed. For example, the BT/WLAN RF transceiver 236 and the WiMAX transceiver 238 may be operable to perform concurrent WiMAX and Bluetooth RF communications based on the coexistence parameters provided via the control subsystem 202. In step 312 a determination whether adjustments may be needed may be is performed. The need for adjustment may be determined during the concurrent RF communications, for example, periodically and/or based on feedback information provided by one or more instances of the resource managers 246 where changes that may affect ongoing RF communications may be detected. In instances where it may be determined that adjustments are needed, the exemplary steps proceeds to step 302, to enable to reconfiguring coexistence operations.

Returning to step 312, in instances where it may be determined that adjustments are not need, the exemplary steps return back to step 310 to continue concurrent RF communications. Once the RF communications are complete, the exemplary steps may terminate.

Various embodiments of the invention may comprise a method and system for dynamic selection of coexistence method and transmit power level based on calibration data. Operations of the plurality of RF transceivers 234, comprising, for example, the BT/WLAN RF transceiver 236, the WiMAX RF transceiver 238a, the cellular RF transceiver 240, the GNSS RF receiver 242, and/or the FM RF transmitter 244 in the communication system 200 may be calibrated to mitigate potential interference caused during concurrent communications via the wireless interfaces in the communication system 200. Calibration may be performed dynamically and/or may be performed during design and/or manufacture of the communication system 200. Calibration operations may comprise managing system parameters and/or physical resources of the communication system 200 and/or the plurality of RF transceivers 234; managing characteristics of wireless communication performed via the plurality of RF transceivers 234; and/or managing isolation between two or more of the plurality of plurality of RF transceivers 234 in the communication system 200. System parameters and/or physical resources may comprise adaptive frequency bands, time slots, antenna access, frequency hopping (AFH) maps, transmission power, use of linearity and/or blocking, and/or antenna settings. Isolation may comprise spatial isolation and/or time-domain based isolation, utilizing transmission and/or reception scheduling arbitration, for example. Characteristics of wireless communication may comprise packet types, packet priority, and/or start time and/or end time of communicated frames. Management of the characteristics of wireless communication may be performed based on performance parameters, which may comprise data transmission priority and/or quality of service (QoS) parameters.

The calibration may be performed based on data generated, via the plurality of RF transceivers 234, during active and/or idle phases of operations. The coexistence manager 216 may be utilized in the communication system 200 to manage overall calibration operations, and may exchange data and/or control signaling with resource manager 246 of each the plurality of RF transceivers 234 to perform calibration operations. The data may be based on monitoring, via each of the plurality of RF transceivers 234, operations of remaining RF receivers and/or transmitters within the plurality of RF transceivers 234. The monitoring may be performed during active and/or or idle states in the monitoring RF receivers and/or transmitters. The monitoring may comprise tracking received signal strength indicator (RSSI) data during wireless transmission via monitored RF transmitters in the plurality of RF transceivers 234. A maximum transmission power level for each of monitored RF transmitters may be determined, based on monitored data for example, to enable performing RF reception via monitoring RF receivers in the plurality of RF transceivers 234, during wireless transmission via monitored RF transmitters.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for dynamic selection of coexistence method and transmit power level based on calibration data.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
in a communication device that comprises a plurality of wireless transmitters or receivers, each of which are operable to communicate via one or more of a plurality of wireless interfaces coupled to a plurality of antennas:
detecting potential interference by an interfering one of said plurality of wireless transmitters or receivers with operations of an interfered-with one of said plurality of wireless transmitters or receivers; and
calibrating operation of one or more of said plurality of wireless transmitters or receivers to mitigate said potential interference,
wherein said calibrating comprises one or more of:
managing isolation between two or more of said plurality of wireless transmitters by causing one of said plurality of wireless transmitters to access a first of said plurality of antennas and a second of said plurality of wireless transmitters to access a second of said plurality of antennas;
managing system parameters or physical resources of said communication device or said plurality of wireless transmitters or receivers; and
managing characteristics of wireless communication performed via said plurality of wireless transmitters or receivers.

2. The method according to claim 1, wherein said calibrating further comprises calibrating operation of said interfering one of said plurality of wireless transmitters or receivers.

3. The method according to claim 1, wherein said calibrating further comprises calibrating operation of said interfered-with one of said plurality of wireless transmitters or receivers.

4. The method according to claim 1, wherein said system parameters or physical resources comprise adaptive frequency bands, time slots, antenna access, frequency hopping (AFH) maps, transmission power, use of linearity or blocking, use of high-low injection, or antenna settings.

5. The method according to claim 1, wherein said characteristics of wireless communication comprise packet types, packet priority, start time of communicated frames, or end time of communicated frames.

6. The method according to claim 1, comprising performing said managing characteristics of said wireless communication based on priority requirements of said wireless communication or quality of service (QoS) requirements of said wireless communication.

7. A system comprising:
one or more circuits in a communication device that comprises a plurality of antennas coupled to a plurality of wireless transmitters or receivers in said communication device, each of said plurality of wireless transmitters or receivers being operable to communicate via one or more of a plurality of wireless interfaces in said communication device;
said one or more circuits being operable to detect potential interference by an interfering one of said plurality of wireless transmitters or receivers with operations of an interfered-with one of said plurality of wireless transmitters or receivers; and
said one or more circuits being operable to calibrate operation of one or more of said plurality of wireless transmitters or receivers to mitigate said potential interference,
wherein said one or more circuits being operable to calibrate operation comprises said one or more circuits being operable to one or more of:
manage isolation between two or more of said plurality of wireless transmitters by causing one of said plurality of wireless transmitters to access a first of said plurality of antennas and a second of said plurality of wireless transmitters to access a second of said plurality of antennas;
manage system parameters or physical resources of said communication device or said plurality of wireless transmitters or receivers; and
manage characteristics of wireless communication performed via said plurality of wireless transmitters or receivers.

8. The system according to claim 7, wherein said one or more circuits are operable to calibrate operation during powering on of said communication device, during communication setup of said plurality of wireless transmitters or receivers, or dynamically during operations of said plurality of wireless transmitters or receivers.

9. The system according to claim 7, wherein said one or more circuits are operable to exchange data or control signaling between a coexistence manager in said communication device and each of said plurality of wireless transmitters or receivers during idle or active periods to enable said calibration.

10. The system according to claim 7, wherein said one or more circuits are operable to monitor, via each of said plurality of wireless transmitters or receivers, operations of other ones of said plurality of wireless transmitters or receivers to detect said potential interference.

11. The system according to claim 7, wherein said one or more circuits are operable to track a received signal strength indicator (RSSI) during wireless transmission by said plurality of wireless transmitters or receivers.

12. The system according to claim 7, wherein said one or more circuits are operable to determine a maximum transmission power for said plurality of wireless transmitters or receivers during wireless transmission.

13. A system comprising:
- a control system in communication with a radio frequency (RF) front-end subsystem, said RF front-end subsystem comprising a plurality of antennas coupled to a plurality of wireless transmitters or receivers in a communication device, each of said plurality of wireless transmitters or receivers operable to communicate via one or more of a plurality of wireless interfaces in said communication device;
- said control system configured to detect, based on interference data provided by said RF front-end subsystem, potential interference by an interfering one of said plurality of wireless transmitters or receivers with operations of an interfered-with one of said plurality of wireless transmitters or receivers; and
- said control system configured to mitigate said potential interference by providing calibration data to said interfered-with one or more of said plurality of wireless transmitters or receivers,
- wherein said control system configured to mitigate said potential interference comprises said control system being configured to one or more of:
- manage isolation between two or more of said plurality of wireless transmitters by causing one of said plurality of wireless transmitters to access a first of said plurality of antennas and a second of said plurality of wireless transmitters to access a second of said plurality of antennas;
- manage system parameters or physical resources of said communication device or said plurality of wireless transmitters or receivers; and
- manage characteristics of wireless communication performed via said plurality of wireless transmitters or receivers.

14. The system according to claim 13, wherein said control system is further configured to mitigate said potential interference during powering on of said communication device, during communication setup of said plurality of wireless transmitters or receivers, or dynamically during operations of said plurality of wireless transmitters or receivers.

15. The system according to claim 13, wherein said calibration data comprises adaptive frequency bands, time slots, antenna access, frequency hopping (AFH) maps, transmission power, linearity control data, blocking control data, high-low injection control data, or antenna settings.

16. The system according to claim 13, wherein said calibration data comprises packet types, packet priority, start time of communicated frames, or end time of communicated frames.

17. The system according to claim 13, wherein said control system is further configured to exchange said interference data or said calibration data during idle or active periods.

18. The system according to claim 13, wherein said control system is further configured to monitor, via each of said plurality of wireless transmitters or receivers, operations of other ones of said plurality of wireless transmitters or receivers to detect said potential interference.

* * * * *